United States Patent Office 2,932,535
Patented Apr. 12, 1960

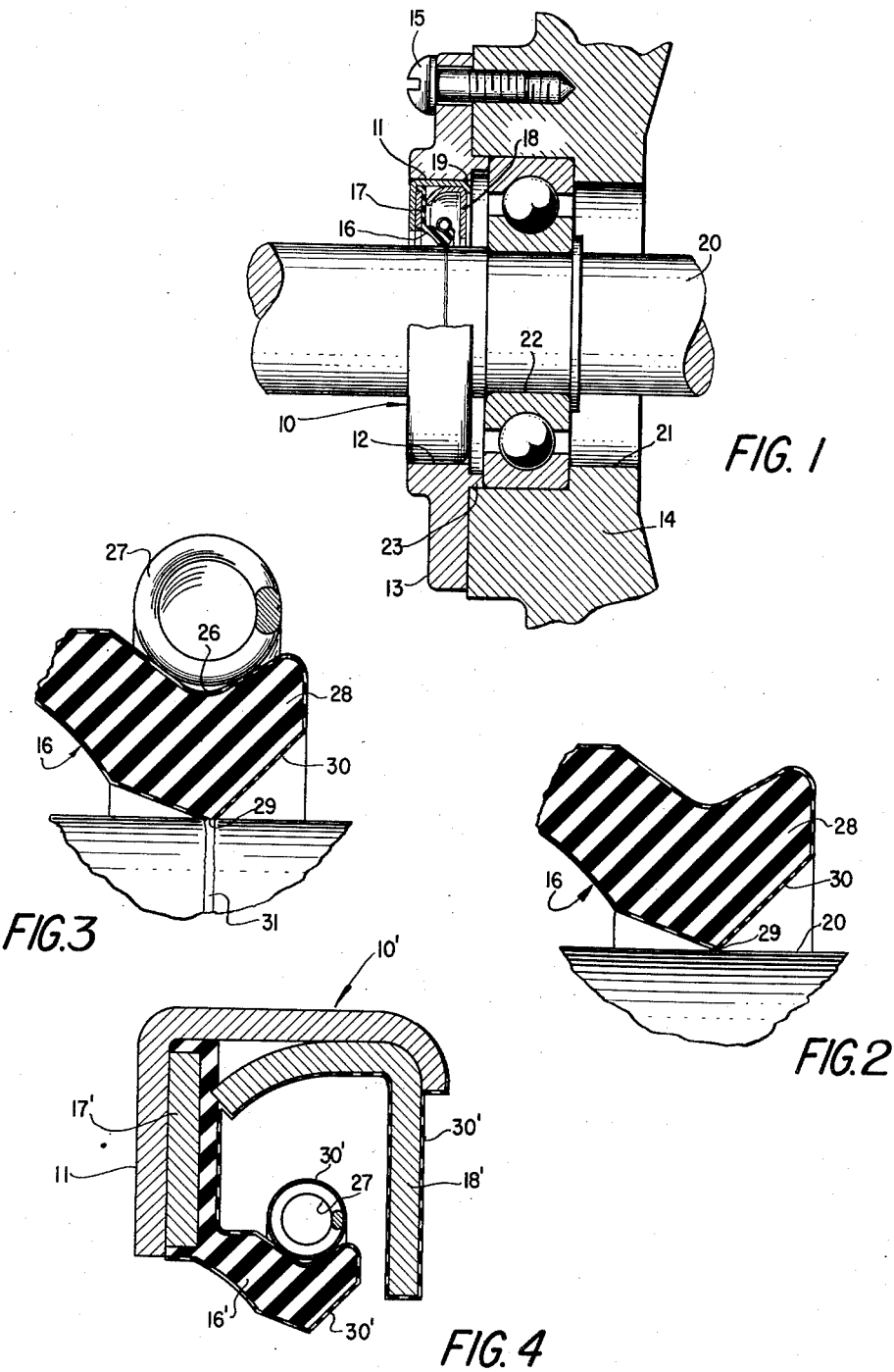

2,932,535

SHAFT SEALS

Vasalie L. Peickii, Hillsborough, and Robert W. McCandless, Redwood City, Calif., assignors, by mesne assignments, to Federal-Mogul-Bower Bearings, Inc., Detroit, Mich., a corporation of Michigan Application May 31, 1955, Serial No. 512,014

3 Claims. (Cl. 288—3)

This invention relates to shaft seals and the like for providing a fluid-tight seal between relatively moving parts whether rotary, reciprocating, oscillating or of some non-regular character.

A primary object of the invention is the provision of a seal in which the resilient element interposed between the relatively moving parts is provided with an exceedingly low friction coating on at least that portion of the resilient member normally in contact with the member to be sealed. More specifically, the present invention relates to a unique shaft seal having an elastomeric sealing element coated in whole or part with a thin layer of tetrafluorethylene as well as to a highly satisfactory method of manufacturing such a seal.

It has long been common practice to make shaft seals with synthetic elastomeric sealing lips. While much success has been experienced in developing elastomers resistant to lubricating mediums, such materials possess other characteristics falling short of the optimum norms desired. For example, available oil resistant elastomers have long service life if operating against a film of oil, but a very short life if the running contact is with a shaft free of oil. Moreover, the friction loss, even when the lip carries a film of lubricant, is far higher than desired. This is not only means a needless power loss due solely to the high friction coefficient of the sealing lip material, but the heat generated thereby seriously affects the service life of the lip. And of course, both of these disadvantages are greatly aggravated by the absence of the lubricating film.

Still another disadvantage of present synthetic sealing lip materials is their susceptibility to attack by many substances often encountered in seal applications. Such substances include chemicals such as sulfur, chlorine, and acid derivatives of products of combustion all of which are commonly encountered in seal applications. Elastomers are also highly vulnerable to ozone which causes fissures and cracks in the surface indicative of the active deterioration taking place and providing passages through which the lubricant bleeds.

The present invention circumvents the foregoing disadvantages in a highly satisfactory manner by an expedient fully as effective as its simplicity. All that is required is the coating of the sealing member with a very thin layer of a chemically inert material having an extremely low coefficient of friction in combination with other equally important characteristics. A coating possessing these properties and which has proven itself so dramatically under actual service conditions comprises a solution of tetrafluorethylene.

Accordingly, a primary object of this invention is the provision of a unique resilient sealing member having a main body of synthetic elastomer and a veneer surface intimately interlocked therewith which is chemically inert and has a negligible coefficient of friction.

Another object is the provision of a shaft seal coated in whole or in part with a film of tetrafluorethylene.

A further object is the provision of a new mode of manufacturing a resilient sealing member which includes adding a film of tetrafluorethylene to the surface of the otherwise finished sealing member as well as to the seal casing itself in those applications where the casing is subject to attack.

Yet another object is the provision of a simple, efficient and inexpensive method of coating the shaft contacting portion of an elastomeric sealing member with a resilient, inert material having an exceedingly low coefficient of expansion.

Numerous other objects and advantages of the invention will become apparent from the following detailed specification and drawings showing one of countless seal designs to which the invention is applicable, and wherein:

Figure 1 is a sectional view through a typical application showing a seal installed therein embodying the present invention;

Figure 2 is a fragmentary view on an enlarged scale showing the seal lip as initially installed;

Figure 3 is a view similar to Figure 2 but showing conditions after the seal has been in service for a lengthy period; and Figure 4 is a sectional view through an alternate seal construction showing all portions of the seal exposed to the interior of the application environment coated with the protective layer of this invention.

Referring to the drawings, it will be seen that the invention is incorporated in a unitary seal ring generally designated 10 having a structure of a well-known type. Thus, the seal includes a cupped outer casing 11, the cylindrical outer surface of which is finished to close tolerances so that it may form a fluid-tight press fit with the bore 12 of a mounting ring 13. Mounting ring 13 may be rigidly secured to a shaft housing 14 as by a plurality of cap screws 15. The sealing element proper includes a resilient flexible member 16 of any suitable oil resistant synthetic rubber such as Buna-N bonded to a metal washer 17. Preferably, one side of the washer is kept free of the elastomer in order that it may seat firmly against the radial flange of casing 11. The edge of the cupped inner casing 18 is so designed as to bite into and form a tight seal with the resilient covering on washer 17 as it is anchored in its assembled position by spinning edge 19 of the outer casing over the corner of casing 18.

In the typical operating environment herein illustrated, the seal is assembled over a shaft 20 extending outwardly through opening 21 of housing 14. The shaft is supported in this opening by a suitable bearing such as the anti-friction assembly generally indicated at 22 having its outer race frictionally seated in the opening 21. Bearing 22 is held in this assembled position by axial flange 23 projecting from the rear face of seal mounting ring 13. It will be appreciated that shaft 20 can be supported by any suitable bearing lubricated in any well-known manner by lubricant circulating thereover from the interior of housing 14. This lubricant would escape along shaft 20 were it not for sealing member 10.

Referring to Figures 2 and 3, it will be seen that the resilient sealing number 16 includes a generally sleeve-like lip-section having an annular groove 26 surrounding its free end and adapted to seat a garter spring 27. The V-shape lip section 28 has its apex 29 in direct contact with shaft 20. The structure described up to this point is of a type generall well-known in the prior art. It will, of course, be quite apparent that the seal may take many different forms and contours and that the form herein described is merely illustrative of one of many suitable forms.

A departure from prior practice of very great importance comprises a thin layer 30 here shown as covering all exposed surfaces of elastomeric sealing member 16. This coating is made of a material which is chemically inert in comparison with the sealing member per se, and therefore admirably adapted to shield and safeguard the same from attack by substances likely to be encountered in the operating environment for the seal. Another important and desirable characteristic of the coating material is its low coefficient of friction.

A material fulfilling the foregoing requirements to an unusual degree is tetrafluorethylene since it is inert to most chemicals including acids and alkalis and also possesses an exceptionally low coefficient of friction. We have found that an exceedingly thin layer of this material suffices to safeguard the body of elastomeric material from attack if care is exercised in covering the exposed surfaces with an impervious film having a minimum thickness of one mil and ranging upwardly to 5 mils or more. We find that a film of one to two mils thick suffices to prolong the service life of the sealing lip many many times. Moreover, in the event of lubricant failure, the presence of the material constituting layer 30 is crucial as otherwise the lip would fail after a brief interval. The reasons for this will be explained insofar as presently understood immediately below.

It is well-known that synthetic sealing members of known elastomeric materials have a very satisfactory pre-service life at normal operating temperatures provided: (1) they are not subject to attack by the lubricating medium, (2) an adequate supply of lubricant is maintained at the point of contact between the shaft and lip and, (3) the heat of friction between the lip and shaft is held to a minimum.

Normally, care is exercised to satisfy each of these essential requirements. However, seal designers are bringing forth new designs daily in which these three essentials cannot be provided. For example, certain defense weapons require seals operating in an atmosphere of fuming nitric acid which neither the metal case nor the elastomeric sealing materials can tolerate. In other applications, exposure to such agents as sulfur and ozone are encountered. In still others, there is likely to be a lubrication failure at the sealing lip for unpredictable periods of time. In each of these instances, we have found that the coating of the present invention is a complete and reliable safeguard. And this is true even though the thin film 30 at the apex 29 of the sealing lip is eventually worn away by contact with the rotating shaft. However, this does not mean that the particles of the coating so removed are discarded or cease to perform a useful function. Quite the contrary is true. This is because of the unusual affinity of the separated tetrafluorethylene for the metal shaft to which it becomes firmly adhered as indicated by band 31 in Figure 2. Accordingly, the detached coating material which now rotates with the shaft continues to form a film between the shaft proper and the body of the sealing lip. It will also be apparent from Figure 2 that the coating material on the shaft is in running contact with the exposed edges of the films on either face of the V-shaped lip, and is most effective in protecting the body of elastomer from attack by ozone or other deleterious chemicals in the immediate vicinity. In addition, these contacting surfaces provide mating surfaces of high lubricity as well as ones having an extremely low coefficient of friction. It follows that the heat of friction as well as the high wear caused by heat will be negligible.

From the foregoing, it will be self-evident that the present lip construction is admirably suited to operate for long periods of time in the absence of any lubrication other than that provided by coating material 30. Normally, of course, there is an adequate supply of lubricant present due to the necessity of lubricating the bearing for shaft 20. But should this lubrication fail for any reason, the user of the appliance need have no fear that seal 10 will fail.

Where the seal is to be employed in an atmosphere which would be injurious to the metal casing, we prefer to extend coating 30 to cover all exposed parts of the casing as well as of the resilient lip itself. There is no necessity for coating any parts of the casing not so exposed. Referring to Figure 4, an alternate form of the present invention is illustrated substantially identical with forms shown in Figures 1 to 3 except that all portions of the casing exposed to the interior of the application housing have been covered with a layer 30' of the same coating employed on the elastomeric sealing lip 16'. Also note that the coating material has been applied to garter spring 27'. If all parts of the metal case were to be exposed to a harmful atmosphere, obviously all surfaces would be covered with a protective layer.

Coating 30 may be applied to the seals in the following manner. First, it is necessary to prepare the coating in thin fluid form. This is done by dispersing finely divided tetrafluorethylene in a suitable fluid vehicle such as water to a consistency suitable to the preferred mode of application and a finished film of the desired thickness. The assembled seal is first thoroughly cleaned and degreased. If it is desired to coat only the lip edge or a restriced portion of the seal, the remainder need not be cleaned but is suitably masked after which the prepared coating is applied evenly to the exposed surface of the portion to be coated. A spray application technique is highly satisfactory for this purpose. After being dried naturally or artificially, the coating is fused at a temperature of 550° to 775° F. for five minutes. Thereafter, the temperature is reduced to approximately 500° F. for a period of 10 to 30 minutes. The completed seal may then be removed from the muffle furnace preferably used in the coating operation. The foregoing procedure fuses the particles of tetrafluorethylene together as well as to the interstices and surface imperfections of the elastomeric member.

Manifestly, the protective coating can be applied to the seal other than by spraying. For example, it could be applied by brushing, a sponge-like pad, or rolled on by well-known rolling techniques. Moreover, it will be quite apparent that other departures may be resorted to other than those referred to above without departing from the scope of the present invention or the essential principles thereof. Furthermore, coatings of greater thickness may be readily obtained by applying more than one coat after the drying operation and varying the duration of the heating cycles if necessary to obtain a thoroughly fused covering.

What we particularly wish to protect and claim as our invention is:

1. That improvement in resilient members for use in sealing a gap between relatively moving members of which at least one is metallic which comprises, a resilient sealing means formed from molded elastomer, means for supporting said sealing means immovably with respect to one of said relatively moving members with one edge of said sealing means in light sealing engagement with the other of said members which is metallic, and a thin layer of chemically inert material having an affinity for metal under conditions of dry rubbing contact therewith and a coefficient of friction no greater than 0.10 bonded to said resilient means over the edge thereof in contact with said other relatively movable member the thickness of said layer being in the range of 1 to 5 mils.

2. The device of claim 1 wherein said chemically inert material is polytetrafluoroethylene.

3. A novel shaft seal having a rigid casing ring adapted to be pressed into a mounting bore therefor, and a synthetic elastomer sealing member having a flexible shaft sealing lip secured to and supported by said casing ring said lip being substantially V-shaped in cross-section and acting to seal the apex thereof against a shaft, and an adherent film of tetrafluorethylene of a thickness between 1 mil and 5 mils covering the lip and the exposed portions of said sealing member.

References Cited in the file of this patent

UNITED STATES PATENTS

| | | |
|---|---|---|
| 1,714,033 | Loudenbeck | May 21, 1929 |
| 2,227,771 | Victor et al. | Jan. 7, 1941 |
| 2,248,761 | Kosatka | July 8, 1941 |
| 2,262,689 | McDowell et al. | Nov. 11, 1941 |
| 2,329,028 | Austin | Sept. 7, 1943 |
| 2,459,721 | Poltorak | Jan. 18, 1949 |
| 2,467,312 | Jack | Apr. 12, 1949 |
| 2,597,976 | Cousins | May 27, 1952 |
| 2,717,025 | Jelinek | Sept. 6, 1955 |
| 2,736,585 | Riesing | Feb. 28, 1956 |
| 2,750,212 | Skinner | June 12, 1956 |
| 2,804,324 | Stallings | Aug. 27, 1957 |